(12) United States Patent
Shearer

(10) Patent No.: US 10,999,969 B2
(45) Date of Patent: May 11, 2021

(54) HEADER WITH FLEXIBLE CROP CUTTING KNIFE COOPERATING WITH A FIXED DRAPER ENGAGEMENT MEMBER

(71) Applicant: MacDon Industries Ltd., Winnipeg (CA)

(72) Inventor: Bruce Robert Shearer, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 263 days.

(21) Appl. No.: 15/817,404

(22) Filed: Nov. 20, 2017

(65) Prior Publication Data

US 2018/0139898 A1 May 24, 2018

Related U.S. Application Data

(60) Provisional application No. 62/426,282, filed on Nov. 24, 2016.

(51) Int. Cl.
| | |
|---|---|
| *A01D 34/28* | (2006.01) |
| *A01D 41/14* | (2006.01) |
| *A01D 57/26* | (2006.01) |
| *A01D 34/04* | (2006.01) |
| *A01D 61/02* | (2006.01) |
| *A01D 34/40* | (2006.01) |
| *A01D 57/03* | (2006.01) |
| *A01D 34/14* | (2006.01) |
| *A01D 47/00* | (2006.01) |

(52) U.S. Cl.
CPC ........... *A01D 34/283* (2013.01); *A01D 34/04* (2013.01); *A01D 34/40* (2013.01); *A01D 41/14* (2013.01); *A01D 41/145* (2013.01); *A01D 57/03* (2013.01); *A01D 57/26* (2013.01); *A01D 61/02* (2013.01); *A01D 34/14* (2013.01); *A01D 41/142* (2013.01); *A01D 47/00* (2013.01)

(58) Field of Classification Search
CPC ...... A01D 34/24; A01D 34/243; A01D 34/28; A01D 34/283; A01D 34/04; A01D 34/40; A01D 34/535; A01D 34/14; A01D 41/14; A01D 41/145; A01D 41/142; A01D 41/144; A01D 47/00; A01D 57/03; A01D 57/20; A01D 57/26; A01D 61/02
See application file for complete search history.

(56) References Cited

U.S. PATENT DOCUMENTS 2,472,762 A    6/1949  Sage
2,915,870 A *  12/1959 Hume .................... A01D 57/20
                                            56/208
(Continued)

*Primary Examiner* — Adam J Behrens
(74) *Attorney, Agent, or Firm* — Miller Canfield

(57) ABSTRACT

A crop harvesting header having a frame mounted on a propulsion vehicle has a cutter bar carrying a sickle knife and a draper transport. The draper is guided at its front edge by a longitudinally extending rail mounted on the frame for movement therewith. The cutter bar is mounted on the frame at spaced positions by spring blades attached to a fixed beam at the rear which allow up and down flexing movement of the cutter bar relative to the draper engagement member. At the center discharge the cutter bar is carried on shorter blades which are carried on a beam in front of the front draper roller. The small amount of flexing of the cutter bar combines with a balanced three piece header frame to provide effective ground following.

21 Claims, 13 Drawing Sheets

(56) References Cited

U.S. PATENT DOCUMENTS

| | | | | |
|---|---|---|---|---|
| 3,813,859 A | * | 6/1974 | Fuller | A01D 34/04 56/260 |
| 3,886,718 A | * | 6/1975 | Talbot | A01D 41/141 56/208 |
| 4,091,602 A | | 5/1978 | Williams | |
| 4,199,925 A | * | 4/1980 | Quick | A01D 41/14 56/208 |
| 4,414,793 A | | 11/1983 | Halls | |
| 4,441,307 A | * | 4/1984 | Enzmann | A01D 41/14 56/10.2 R |
| 4,599,852 A | | 7/1986 | Kerber et al. | |
| 4,660,360 A | | 4/1987 | Hardesty | |
| 4,665,685 A | * | 5/1987 | Rupprecht | A01D 41/14 56/15.8 |
| 6,675,568 B2 | | 1/2004 | Patterson et al. | |
| 6,782,683 B2 | * | 8/2004 | Buermann | A01D 41/14 56/257 |
| 7,444,798 B2 | | 11/2008 | Patterson et al. | |
| 7,472,533 B2 | | 1/2009 | Talbot | |
| 7,614,206 B2 | * | 11/2009 | Tippery | A01D 41/144 56/15.8 |
| 7,802,417 B2 | * | 9/2010 | Sauerwein | A01D 41/14 56/181 |
| 7,886,512 B2 | * | 2/2011 | Lohrentz | A01D 57/20 56/181 |
| 7,913,481 B2 | | 3/2011 | Sauerwein | |
| 7,918,076 B2 | | 4/2011 | Talbot | |
| 7,926,248 B2 | | 4/2011 | Schmidt | |
| 7,930,871 B1 | * | 4/2011 | Figgins | A01D 41/141 56/208 |
| 7,992,372 B1 | * | 8/2011 | Coers | A01D 41/14 56/153 |
| 7,992,374 B1 | * | 8/2011 | Bich | A01D 41/141 56/208 |
| 8,061,115 B2 | | 11/2011 | Honas et al. | |
| 8,769,919 B2 | * | 7/2014 | Cormier | A01D 43/06 56/181 |
| 9,402,343 B1 | | 8/2016 | Allochis | |
| 9,408,346 B2 | | 8/2016 | Selting et al. | |
| 9,526,206 B2 | | 12/2016 | Ruckamp | |
| 9,526,210 B2 | | 12/2016 | Selting et al. | |
| 9,775,291 B2 | | 10/2017 | Neudorf | |
| 2010/0083629 A1 | * | 4/2010 | Klotzbach | A01D 41/14 56/320.1 |
| 2011/0308224 A1 | * | 12/2011 | Buermann | A01D 34/14 56/296 |

\* cited by examiner

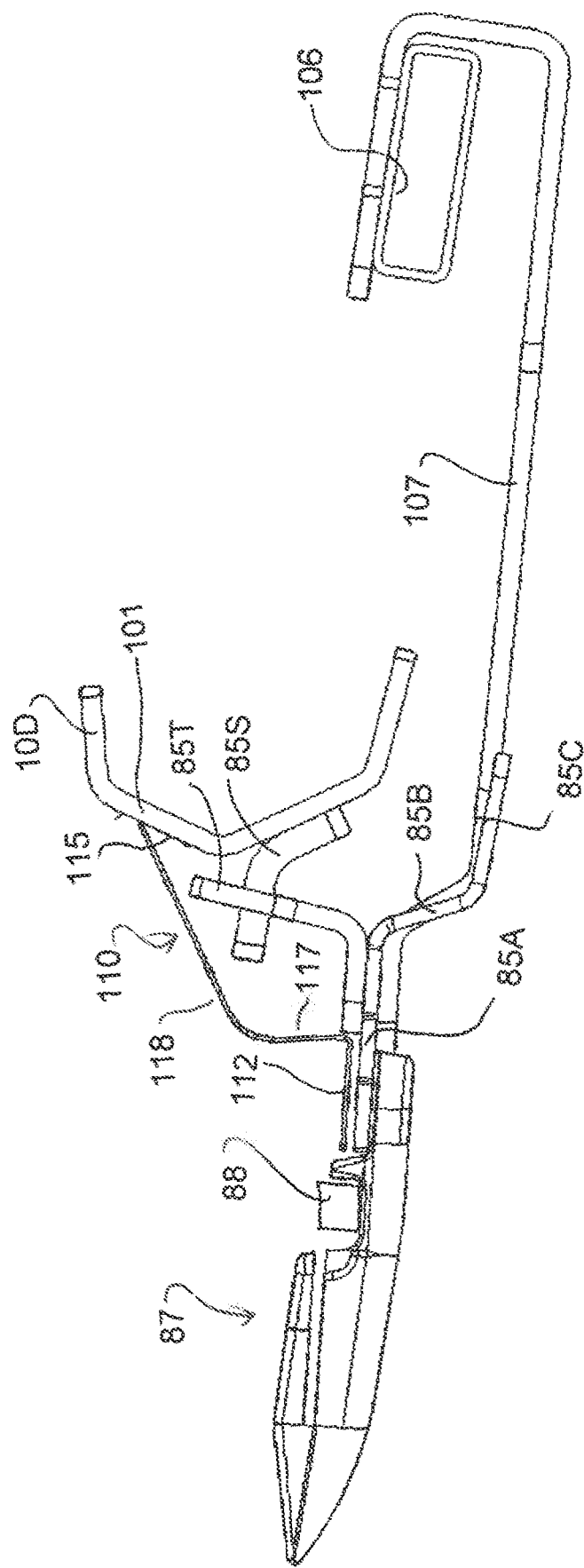

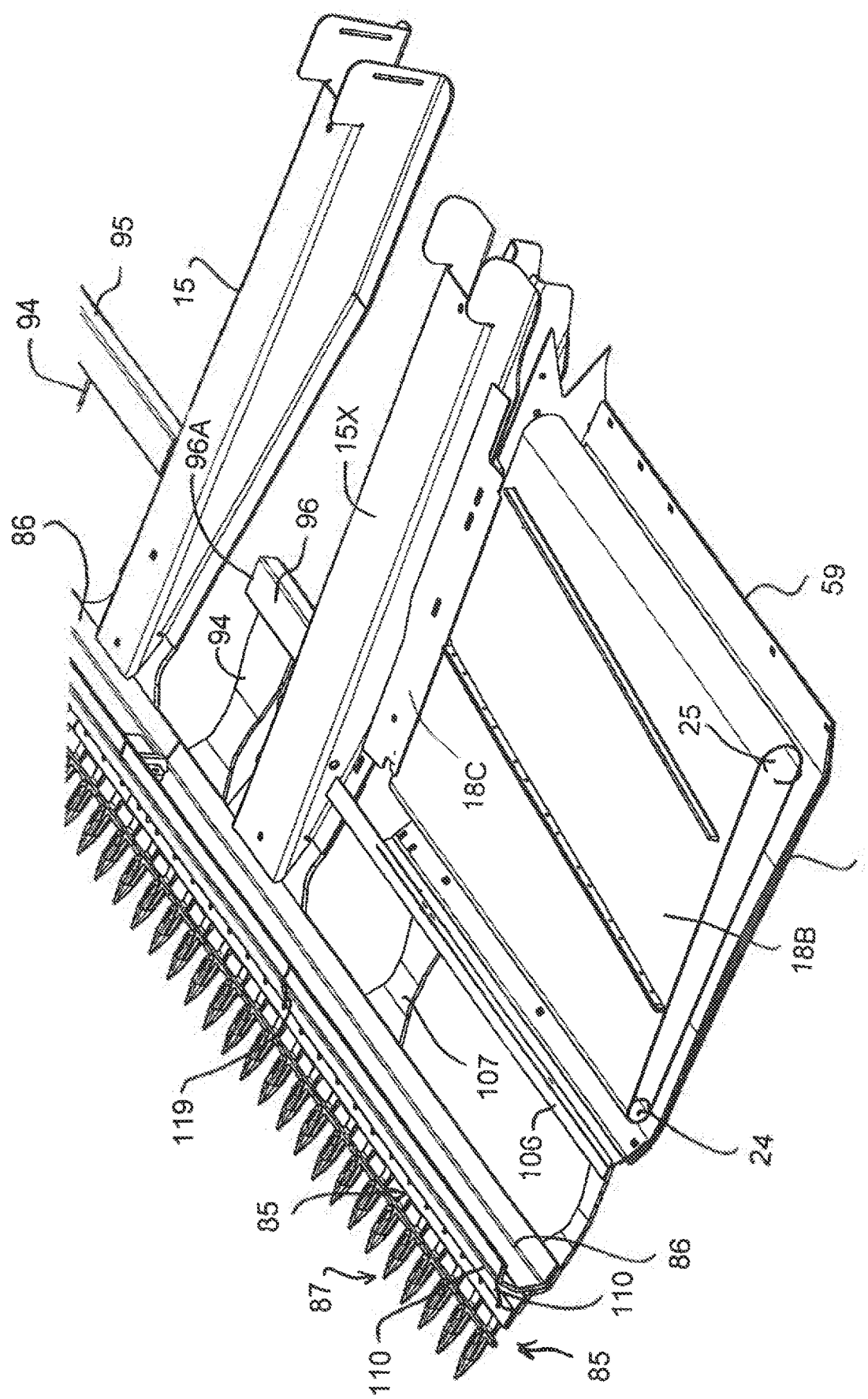

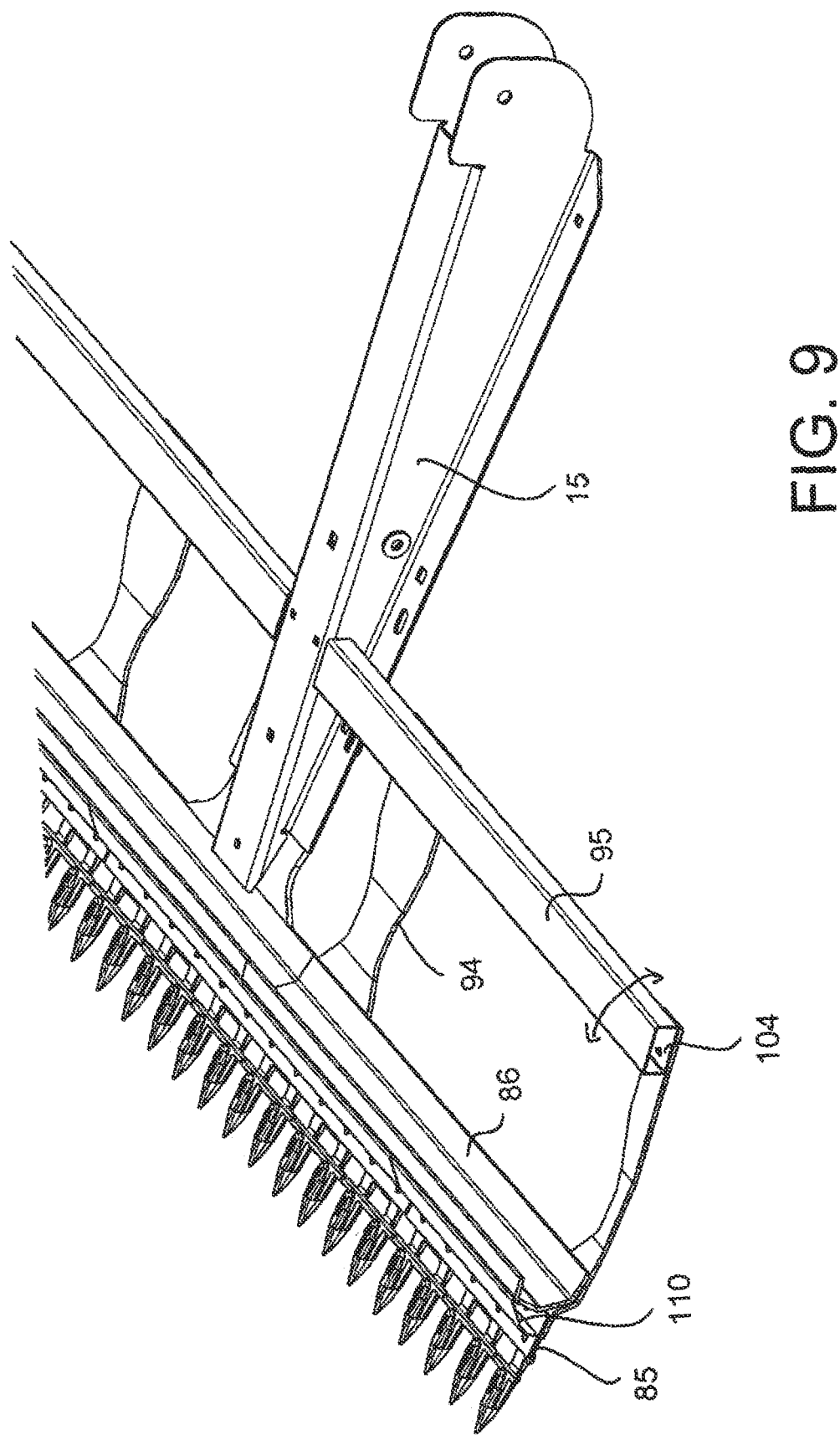

HEADER WITH FLEXIBLE CROP CUTTING KNIFE COOPERATING WITH A FIXED DRAPER ENGAGEMENT MEMBER

This invention relates to a crop harvesting header on which is carried a flexible crop cutting knife. The header frame can be formed as a multi-section construction hinged at one or more forwardly extending pivot points but many of the features of the invention are applicable to headers where the frame is rigid. The header is of the type which uses a draper arrangement for transferring the cut crop to the discharge opening. A reel is also typically provided which carries the crop over the cutting knife.

BACKGROUND OF THE INVENTION

Headers for a crop harvesting machine generally comprises a main longitudinal support member in the form of an elongate tube which extends across substantially the full width of the header frame and defines a main structural member for the header frame. The tube carries a plurality of forwardly and downwardly extending support beams which include a first portion extending downwardly and a second portion attached to a lower end of the first portion and extending forwardly therefrom toward a forward end of the support beams. The cutter bar is attached to the forward end of the support beams and is thus held thereby in a position generally parallel to the main support tube.

Many headers are of a type in which the cutter bar is intended to be in a fixed rigid position relative to the main support tube so that the cutter bar is not intended to flex or float relative to the main structural tube in response to changes in ground contour.

This rigid type of header has the advantage that it allows more accurate control of the position of the fingers or bats of the reel relative to the cutter bar so as to more accurately control the crop as it is swept onto the cutter bar and the table rearwardly of the cutter bar. In this rigid header type, therefore, the support beams extending forwardly from the main structural tube are substantially rigid and hold the cutter bar in fixed position.

Alternative types of header mount the cutter bar for flexing movement relative to the main structural support tube. This type of header is used to provide an improved action in following the contour of the ground and is advantageous in some circumstances. Thus when cutting crops right at the ground it is desirable that the cutter bar of larger headers, greater than of the order of 20 feet, is somewhat flexible to follow the ground contour.

Another type of header provides a multi-section arrangement of frame the hinged at one or more forwardly extending pivot points. This type of header again is used to allow close floating action of the cutter bar on the ground surface.

SUMMARY OF THE INVENTION

It is an object of the present invention to provide a crop harvesting header which provides a flexible cutting sickle knife.

According to a one important aspect of the invention there is provided a crop harvesting header comprising:

a frame extending across a width of the header for movement in a forward direction generally at right angles to the width across ground including a crop to be harvested;

a mounting assembly for carrying the main frame structure on a propulsion vehicle for up and down movement relative to the vehicle;

wherein the mounting assembly provides a floating action of the frame relative to the propulsion vehicle;

a cutter bar arranged to move over the ground in a cutting action and carrying a sickle knife operable for cutting the crop as the header is moved forwardly across the ground;

a ground engaging structure for engaging the ground so as to receive lifting forces from the ground at points of the ground engaging structure which contact the ground tending to lift the cutter bar;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the frame being divided at least into a first frame portion and a second separate frame portion with the second connected by a pivot coupling arranged for pivotal movement of the second relative to the first about a pivot axis generally parallel to the forward direction and intersecting the cutter bar so that, as the second pivots, the cutter bar bends in the area adjacent the respective pivot axis to accommodate the pivotal movement;

the cutter bar being mounted on the first frame portion at spaced positions along the length of the first frame portion by mounting components which allow up and down flexing movement of the cutter bar relative to the first frame portion;

the cutter bar being mounted on the second frame portion at spaced positions along the length of the second frame portion by mounting components which allow up and down flexing movement of the cutter bar relative to the second frame portion;

the support assembly including a first support arranged to provide a first lifting force for the first frame portion leaving some weight applied by the ground engaging structure of the first frame portion to the ground;

the support assembly including a second support arranged to provide a second lifting force for the second frame portion leaving some weight applied by the ground engaging structure of the second frame portion to the ground;

the support assembly being arranged to provide floating movement for each of the first and second frame portions such that, as the first and second lifting forces vary, the weight applied by each of the first and second frame portions to the ground is maintained at least partly balanced.

According to a one important aspect of the invention there is provided a crop harvesting header comprising:

a frame extending across a width of the header for movement in a forward direction generally at right angles to the width across ground including a crop to be harvested;

a mounting assembly for carrying the frame on a propulsion vehicle for up and down movement relative to the vehicle;

a cutter bar arranged to move over the ground in a cutting action and carrying a sickle knife operable for cutting the crop as the header is moved forwardly across the ground;

a ground engaging structure for engaging the ground so as to receive lifting forces from the ground at points of the ground engaging structure which contact the ground tending to lift the cutter bar;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the frame being divided at least into a first frame portion and a second separate frame portion with the second connected by a pivot coupling arranged for pivotal movement of the second relative to the first about a pivot axis generally parallel to the forward direction and intersecting the cutter bar so that, as the second pivots, the cutter bar bends in the area adjacent the respective pivot axis to accommodate the pivotal movement;

the cutter bar being mounted on the first frame portion at spaced positions along the length of the first frame portion by mounting components which allow up and down flexing movement of the cutter bar relative to the first frame portion;

the cutter bar being mounted on the second frame portion at spaced positions along the length of the second frame portion by mounting components which allow up and down flexing movement of the cutter bar relative to the second frame portion;

wherein the amount of flexing movement of the cutter bar relative to the respective one of the first and second frame portions allowed by the mounting components is less than a total of six inches;

and wherein the pivotal movement of the first frame portion relative to the second separate frame portion provided by the pivot coupling is arranged such that an outer end of the first frame portion remote from the second frame portion moves vertically by a distance less than a total of 20 inches.

According to a one important aspect of the invention there is provided a crop harvesting header comprising:

a frame extending across a width of the header for movement in a forward direction generally at right angles to the width across ground including a crop to be harvested;

a mounting assembly for carrying the frame on a propulsion vehicle for up and down movement relative to the vehicle;

a cutter bar arranged to move over the ground in a cutting action and having a forwardly extending flange carrying a sickle knife operable for cutting the crop as the header is moved forwardly across the ground;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the draper transport system including a longitudinally extending draper engagement member adjacent the front edge of the draper, the draper engagement member being fixed to the frame for movement therewith;

the cutter bar being mounted on the frame at spaced positions along the length of the frame by mounting components which allow up and down flexing movement of the cutter bar relative to a rigid member of the frame and therefore relative to the draper engagement member;

wherein the cutter bar is mounted immediately forward of the draper engagement member with a component of the cutter bar underlying the draper engagement member.

Preferably the component of the cutter bar which lies underneath the draper engagement member includes the ground engaging skid member of the cutter bar. The metal bar forming the cutter bar can include components of the metal bar extending rearwardly to a position directly underneath the draper engagement bar to support the skid plate. The skid plate is typically formed of a plastic wear resistant material and is bolted to the bar itself for replacement. That is preferably a rear edge of the skid member lies rearward of a front edge of the draper engagement member.

According to a one important aspect of the invention there is provided a crop harvesting header comprising:

a frame extending across a width of the header for movement in a forward direction generally at right angles to the width across ground including a crop to be harvested;

a mounting assembly for carrying the frame on a propulsion vehicle for up and down movement relative to the vehicle;

a cutter bar arranged to move over the ground in a cutting action and having a forwardly extending flange carrying a sickle knife operable for cutting the crop as the header is moved forwardly across the ground;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the draper transport system including a longitudinally extending draper engagement member adjacent the front edge of the draper, the draper engagement member being fixed to the frame for movement therewith;

the cutter bar being mounted on the frame at spaced positions along the length of the frame by mounting components which allow up and down flexing movement of the cutter bar relative to a rigid member of the frame and therefore relative to the draper engagement member;

wherein there is provided a flexible crop deflector plate extending between the cutter bar and the draper engagement member, the deflector plate having a front edge fixedly attached to the cutter bar and having a rear edge surface in sliding contact with a front surface of the draper engagement member.

Preferably the front edge of the flexible crop deflector plate is bolted to the cutter bar in a manner which prevents pivoting movement of the plate relative to the cutter bar and wherein the up and down movement of the cutter bar is accommodated in the deflector plate by said sliding movement of the rear edge and by flexing within the plate without any pivotal movement.

According to a one important aspect of the invention there is provided a crop harvesting header comprising:

a frame extending across a width of the header for movement in a forward direction generally at right angles to the width across ground including a crop to be harvested;

a mounting assembly for carrying the frame on a propulsion vehicle for up and down movement relative to the vehicle;

a cutter bar arranged to move over the ground in a cutting action and having a forwardly extending flange carrying a sickle knife operable for cutting the crop as the header is moved forwardly across the ground;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the draper transport system including a longitudinally extending draper engagement member adjacent the front edge of the draper, the draper engagement member being fixed to the frame for movement therewith;

the cutter bar being mounted on the frame at spaced positions along the length of the frame by mounting components which allow up and down flexing movement of the cutter bar relative to a rigid member of the frame and therefore relative to the draper engagement member;

wherein the frame is divided at least into a first frame portion and a second separate frame portion with the second connected by a pivot coupling arranged for pivotal movement of the second relative to the first about a pivot axis generally parallel to the forward direction and intersecting the cutter bar so that, as the second pivots, the cutter bar bends in the area adjacent the respective pivot axis to accommodate the pivotal movement and wherein the draper engagement member includes a hinge at the pivot axis.

According to a one important aspect of the invention there is provided a crop harvesting header comprising:

a frame extending across a width of the header for movement in a forward direction generally at right angles to the width across ground including a crop to be harvested;

a mounting assembly for carrying the frame on a propulsion vehicle for up and down movement relative to the vehicle;

a cutter bar arranged to move over the ground in a cutting action and carrying a sickle knife operable for cutting the crop as the header is moved forwardly across the ground;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the cutter bar being mounted on the frame at spaced positions along the length of the frame by mounting components which allow up and down flexing movement of the cutter bar relative to the frame;

wherein the mounting components which allow up and down flexing movement of the cutter bar relative to the frame comprise a first fixed frame structure fixedly mounted relative to the frame including a rigid member extending longitudinally of the frame parallel to and rearwardly of the cutter bar and located forwardly of a rear bottom member of the frame a rear edge of the draper and a plurality of support members extending forwardly from the first rigid member to the cutter bar allowing the up and down flexing movement of the cutter bar relative to the rigid member.

According to a one important aspect of the invention there is provided a crop harvesting header comprising:

a frame extending across a width of the header for movement in a forward direction generally at right angles to the width across ground including a crop to be harvested;

a mounting assembly for carrying the frame on a propulsion vehicle for up and down movement relative to the vehicle;

a cutter bar arranged to move over the ground in a cutting action and carrying a sickle knife operable for cutting the crop as the header is moved forwardly across the ground;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the cutter bar being mounted on the frame at spaced positions along the length of the frame by mounting components which allow up and down flexing movement of the cutter bar relative to the frame;

wherein the mounting components which allow up and down flexing movement of the cutter bar relative to the frame comprise a plurality of flexible blades each rigidly attached at its rear end to a rigid member of the frame and rigidly attached at its forward end to the cutter bar and providing flexibility between the rear end and forward end.

According to a one important aspect of the invention there is provided a crop harvesting header comprising:

a frame extending across a width of the header for movement in a forward direction generally at right angles to the width across ground including a crop to be harvested;

a mounting assembly for carrying the frame on a propulsion vehicle for up and down movement relative to the vehicle;

a cutter bar arranged to move over the ground in a cutting action and carrying a sickle knife operable for cutting the crop as the header is moved forwardly across the ground;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the cutter bar being mounted on the frame at spaced positions along the length of the frame by mounting components which allow up and down flexing movement of the cutter bar relative to the frame;

wherein there is provided a center section at the discharge location of the header at which is located a fore and aft draper for carrying the cut crop rearwardly from the cutter bar to a discharge opening, the draper including a front draper roller located at a position spaced rearwardly of the cutter bar, and wherein there is provided a rigid support member across the frame in front of the front draper roller and at least one member extending forwardly from the rigid support member to the cutter bar to allow the flexing thereof.

Preferably the mounting assembly provides a floating action of the header frame relative to the propulsion vehicle which can be provided either by a spring arrangement or by float cylinders. Typically the header can also tilt side to side about a forward axis.

Where a multi-section header is used, preferably the weight applied by each of the first and second frame portions to the ground is maintained at least partly balanced by changing the lifting forces applied to both the first and second frame portions. In this arrangement, the lifting forces applied to both the first and second frame portions are applied from the propulsion vehicle without gauge wheels. In this arrangement, the lifting forces applied to both the first and second frame portions is varied by balancing the lifting forces applied to both the first and second frame portions relative to a total lifting force applied to the main frame structure without sensors detecting contact with the ground or sensors detecting forces applied to both the first and second frame portions.

Preferably the amount of flexing movement of the cutter bar relative to the frame of the respective one of the first and second frame portions allowed by the mounting components is less than a total of six inches, preferably less than a total of four inches and more preferably of the order of a total of two inches. This very low level of flex of the cutter bar relative to frame is supplemented by movement of one frame section relative to the other where the pivotal movement of the first frame portion relative to the second separate frame portion provided by the pivot coupling is arranged such that an outer end of the first frame portion remote from the second frame portion moves vertically by a distance less than a total of 20 inches and preferably less than 15 inches and more preferably of the order of 12 to 15 inches.

Preferably the mounting components which allow up and down flexing movement of the cutter bar relative to the first frame portion comprises a first fixed frame structure fixedly mounted relative to the first frame portion including a first rigid member extending longitudinally of the first frame portion parallel to and rearwardly of the cutter bar and forwardly of a rear edge of the draper and a plurality of support members extending forwardly from the first rigid member to the cutter bar allowing the up and down flexing movement of the cutter bar relative to the first rigid member.

Preferably the first rigid member comprises a beam at a position spaced forwardly of a rear of the frame so as to leave an open space therebetween and at a position spaced approximately midway across the draper and underneath a return run of the draper.

Preferably the mounting components which allow up and down flexing movement of the cutter bar relative to the first frame portion comprises a flexible blade rigidly attached at its rear end to the frame where typically the frame and the cutter bar are connected only by a plurality of flexible blades each rigidly attached at its rear end to the frame and each carrying the cutter bar at its forward end. While flexible blades or leaf springs or are preferably used as this provides a simple light weight inexpensive arrangement with resistance to flexing in both the upward and downward directions, the mounting components can use pivotal arms which pivot about a single axis transverse to the forward direction. Where flexible blades are used, of course these do not pivot about a single axis but instead they flex at various positions along their length depending on the shape and thickness of the blade selected.

The term "blade" as used herein is not intended to limit the structure to a specific cross-sectional shape which is necessarily wider than it is high. It will be appreciated that the blade can be formed by a single leaf spring member. However it is not necessarily required that a single leaf is used as a complex multi-leaf construction can be used depending on the force required both the support the cutter bar and to resist rearward forces on the cutter bar due to impact. The blade is intended to provide both upward lifting forces and horizontal resistance to compression in a single component. The blade is intended to provide the up and down floating movement by flexing rather than by pivotal movement about a specific axis.

In this arrangement typically the second section comprises a center section at the discharge location of the header at which is located a fore and aft draper for carrying the cut crop rearwardly from the cutter bar to a discharge opening, the draper including a front draper roller located at a position spaced rearwardly of the cutter bar. The center section is typically connected to a second wing section opposite the first section. In this arrangement preferably there is provided a rigid support member across the frame in front of the front draper roller and at least one flexible blade extending forwardly from the rigid support member to the cutter bar to allow the flexing thereof.

Preferably the flexible blades at the fore and aft draper are shorter than the flexible blades in the first section and are arranged to provide a resistance to bending substantially equal to that of the blades in the first section although the arc of movement may be different.

Preferably the cutter bar has a constant level of flexibility along its length so that the blades are arranged to provide a constant resistance to flexing.

Preferably the draper is carried on frame so as to be fixed on the frame against flexing with the cutter bar. That is the front edge of the draper is carried on a longitudinally extending support member fixed on the frame against flexing with the cutter bar with the cutter bar carried on a plurality of forwardly extending support members underneath the longitudinal support member.

Preferably there is provided a flexible deflector plate extending between the cutter bar and the longitudinal support member, the deflector plate having a front edge attached to the cutter bar and having a rear edge surface in sliding contact with a front surface of the longitudinal support member. In this arrangement, the deflector plate includes a wall standing upwardly from the cutter bar and extending rearwardly to the rear edge which may include a turned down flange at the rear edge for contacting the front surface of the longitudinal support member. The deflector plate is typically divided longitudinally into a plurality of end to end sections with an overlap between each and the next at the ends to accommodate the flexing of the cutter bar.

Preferably the end of cutter bar is fixed to a header end plate of the frame which is held against flexing with the cutter bar. However the cutter bar may be flexible along its whole length and may be supported on flex blades even at the ends. This arrangement can be typically used with a center knife drive so as to reduce the requirement for rigidity at the ends.

In some cases the cutter bar is allowed to flex upwardly and downwardly without physical stops to limit the movement and particularly the downward movement. The upward stop can be provided by the cutter bar impacting the underside of the draper engagement member which contacts and locates the front edge of the draper.

Preferably wherein the draper engagement member at the front edge of the draper which is typically fixed to the frame includes a component which engages a top surface of draper at the front edge to make a seal therewith. Various arrangements for seal have been previously proposed and can be used. As this member remains fixed relative to the draper itself, sealing can be effective.

In some cases it is desirable to provide a physical stop to limit downward movement of the cutter bar. In this case the physical stop can be connected between the draper engagement member and the cutter bar so that the physical stop is independent of the mounting components.

BRIEF DESCRIPTION OF THE DRAWINGS

One embodiment of the invention will now be described in conjunction with the accompanying drawings in which:

FIG. 7A is a cross sectional view of the components of FIG. 7 showing some aspects in greater detail and showing a number of modifications.

FIG. 8 is an isometric view of the components at the center section of the header at the center draper.

FIG. 9 is an isometric view of the components at the wing section of the header at the side draper.

In the drawings like characters of reference indicate corresponding parts in the different figures.

DETAILED DESCRIPTION

Figure 1:
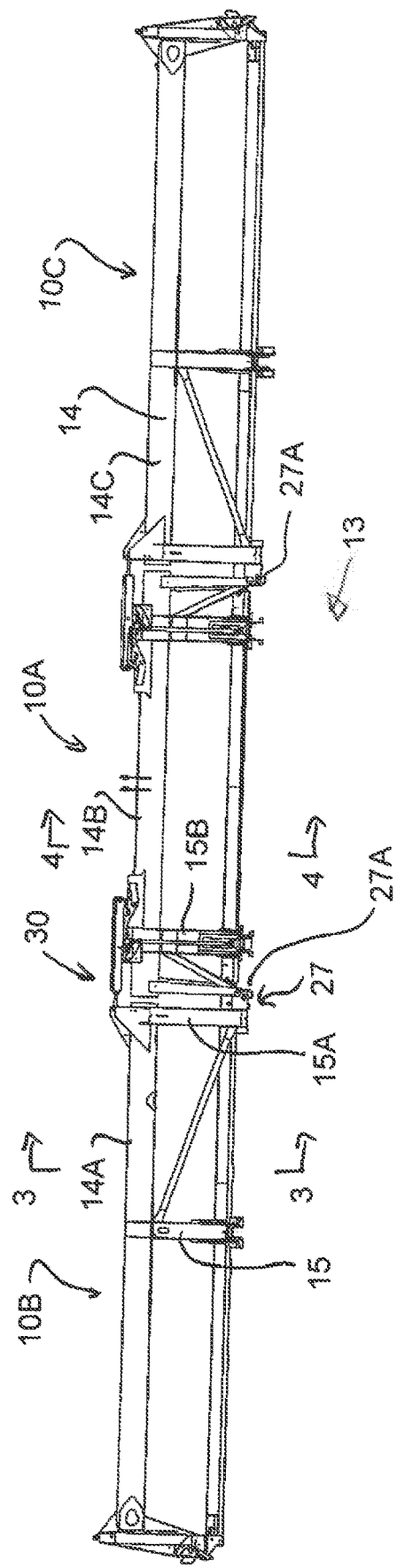
FIG. 1 is a schematic rear elevational view of a first embodiment of a header according to the present invention with the combine harvester which acts as a propulsion vehicle, with the associated adapter and the reel being omitted for convenience of illustration.
Figure 2:
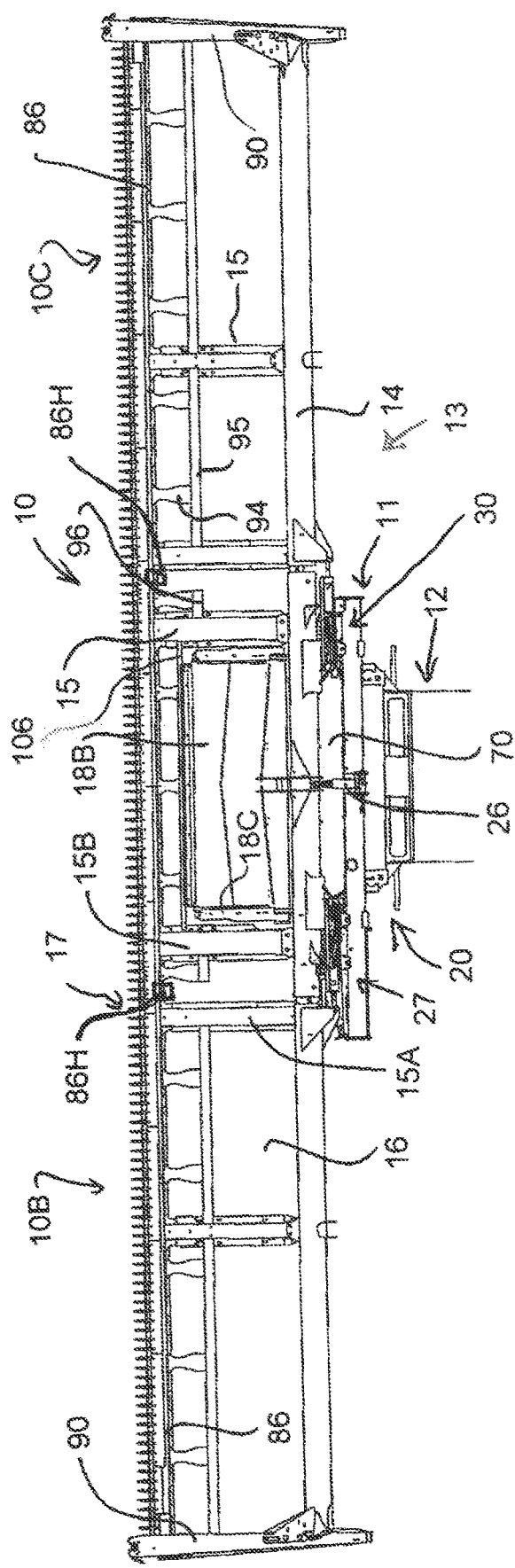
FIG. 2 is a schematic top plan view of the header of FIG. 1.
Figure 3:
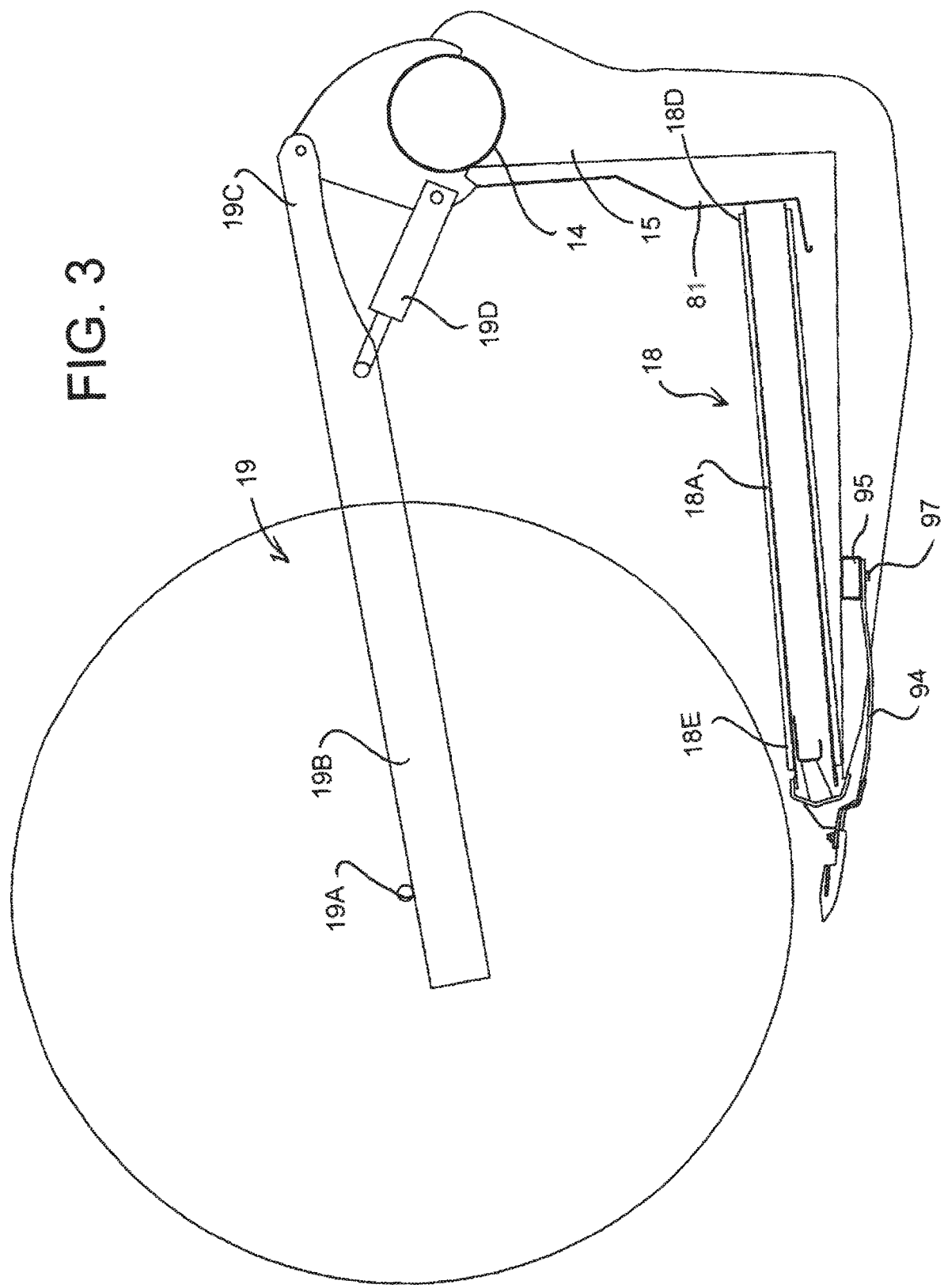
FIGS. 3 and 4 are each a cross sectional views respectively along the lines 3-3 and 4-4 of FIG. 1 including the adapter and float system.

FIGS. 1 and 2 show in rear elevational view and in plan view respectively a header 10 carried on an adapter 11 attached to the feeder house 12 of a combine harvester. In FIG. 1 the adapter is omitted for convenience of illustration.

The header 10 includes a frame 13 defined by a main rear beam 14 and a plurality of forwardly extending arms 15 which extend downwardly from the beam 14 and then forwardly underneath a table 16 which extends across the header. At the forward end of the table 16 is provided a cutter bar 17. On top of the table 16 is provided a draper transport system 18 (not shown in FIGS. 1 and 2) which carries the crop from the cutter bar across the header to a discharge location at the feeder house 12. The draper thus include two side drapers extending from respective ends of the header inwardly toward the feeder house and a center adapter section 18B which acts to feed the crop from the side drapers 18A rearwardly to the feeder housing.

The header further includes a reel 19 including a beam 19A on which is mounted a plurality of reel bats (not shown) which are carried on the beam 19A for rotation with the beam around the axis of the beam. The beam is carried on reel support arms 19B which extend from the beam rearwardly and upwardly to a support bracket attached to the transverse main beam 14. The reel arms can be raised and lowered by hydraulic cylinders 19D connected between the respective arm and the beam 14.

In the embodiment shown the reel is mounted on four arms 19B including two arms at the ends of the header and two center arms being spaced apart either side of the adapter 11.

The adapter 11 comprises a frame 20 which attaches to the feeder house 12 and carries at its lower end a pair of forwardly extending pivotal arms (not shown) which extend forwardly underneath respective ones of the frame members 15 of the header. The pivotal arms can pivot upwardly and downwardly about a respective pivot pins each independently of the other arm. Each arm is supported by a respective spring carried on a respective stub arm attached to the respective arm. Thus the spring provides tension on the stub arm pulling it upwardly around the pin which acts to pull up the respective arm and provide a lifting force underneath the header at a lifting point partway along the respective frame member 15 and underneath the draper 18 and the table 16.

At the center of the adapter is provided a link 26 which extends from the frame 20 forwardly to the central bracket 19C of the beam arm support brackets. The link 26 is provided in the form of a hydraulic cylinder which allows adjustment of the length of the cylinder thus pivoting the header forwardly and rearwardly about the support point of the arms on the underside of the header. Thus the attitude of the header, that is the angle of the table 16 to the horizontal can be tilted by operation of the cylinder forming the link 26.

In addition the attitude of the header about an axis extending forwardly of the direction of movement that is at right angles to the transverse beam 14 is effected by the independent pivotal movement of the arms provided by the springs which act as a floatation system. In addition the whole header can float upwardly and downwardly on the springs with the link 26 pivoting to accommodate the upward and downward movement and the arms pivoting about the respective pin.

The cutter bar 17 includes a skid plate 16A which is arranged to engage the ground. Thus upward force is provided from the ground which tends to lift the header taking weight off the support springs. In practice the springs are adjusted so that the springs act to support the majority of the weight of the header leaving a relatively small proportion of the weight to rest on the ground. Thus the header can float upwardly and downwardly as the ground provides areas of different height with one end of the header being movable upwardly independently of the other end by independent flexing of the springs. Thus the header tends to follow the ground level. In other arrangements the header can be supported on wheels or skids so as to support the cutter bar spaced away from the ground.

The header is formed in a number of sections which are independently pivotal each relative to the next and in which adjustment of the lifting force provided by the springs is transferred to each of the sections proportionally so that each section can float upwardly and downwardly and each section applies a force to the ground which is proportional to the total force of the whole header.

Thus the beam 14 is divided into a number of separate pieces 14A, 14B and 14C depending upon the number of sections of the header. In the embodiment shown there are three sections including a center section 10A, a first wing section 10B and a second wing section 10C. The center section 10A is mounted at the adapter so that the arms extend into engagement with the center section. The wing sections are pivotally connected to the center section such that each can pivot upwardly and downwardly about a respective pivot axis generally parallel to the direction of movement.

Thus the beam 14 is split into three portions each co-operating with a respective one of the sections 10A, 10B and 10C and defining a main beam therefor. Each section of the beam 14 includes respective ones of the frame members 15 which support the respective portion of the table. There is a break 14A between the beam sections 14 of the center section 10A and one wing section 106. The end most frame member 15A of the wing section 10B is arranged at the break. The end frame member 15B of the center section 10A is spaced inwardly from the break leaving space for a pivot coupling 27 extending from the frame member 15A to the frame member 15B and defining a pivot pin lying on the pivot axis between the wing section 10B and the center section 10A. The hinge at which the pivotal action occurs is provided by a hinge pin 27A, with one pin being located at each end of the center section 10A. The axis of the pin extends in the forward direction so as to intersect the cutter bar 17 which is formed in a manner which allows it to flex on the axis of the pin 27A thus avoiding the necessity for a break in the cutter bar.

Thus the two sections 10A and 10B are supported each relative to the other for pivotal movement of the wing section 10B about the axis extending through the pin 27A and through the cutter bar so that the wing section is supported at its inner end on the center section but the outer end can pivot upwardly and downwardly at so that the weight at the outboard end is unsupported by the center section and causes downward or counter clockwise pivotal movement of the wing section 10B.

The wing section 10C is mounted in an identical or symmetrical manner for pivotal movement about the other end of the center section 10A. The amount of pivotal movement allowed of the wing section relative to the center section about the axis of the pivot pin is maintained at a small angle generally less than 6 degrees and preferably less than 4 degrees as controlled by suitable mechanical stop members which are provided at a suitable location with the required mechanical strength to support the wing frame section against upward or downward movement beyond the stop members. This provides an amount of flex at the outer ends which is arranged such that an outer end of the first frame portion remote from the second frame portion moves vertically from an uppermost position to a lowermost position by a total distance less than 20 inches, more preferably by a distance less than 15 inches and typically in a suitable example by a distance in the range of 12 to 15 inches.

The outboard weight of the wing section 10B is supported on a linkage 30 which communicates that weight from the inner end of the beam 14 of the section 10B through to the support for the center section 10A at the springs 24. The linkage is shown and described in full detail in U.S. Pat. No. 6,675,568 and in U.S. Pat. No. 7,918,076 to which reference may be made or the disclosures of which are incorporated herein by reference.

In general the linkage operates to transfer the outboard weight of the wing section inwardly to the center section and at the same time to balance the lifting force provided by the springs 24 so that it is proportionally applied to the center section and to the wing section.

Thus in general the header is attached to the combine feeder house 12 using the float system described previously that supports the header so that it can be moved up when a vertical force about 1% to 15% of its weight is applied to the cutter bar from the ground. The reaction of the float linkage that typically supports 85% to 99% of the header weight on the header is used to balance the weight of the wings.

The system is designed so that if the operator sets the float so that the float system supports 99% of the header weight then the remaining 1% will be evenly distributed across the cutter bar. If the operator changes the float so that 85% is supported by the combine harvester then the remaining 15% would also be evenly distributed across the cutter bar without the operator making adjustments. Thus, not only is the total lifting force to each sections varied in proportion to the total lifting force but also that lifting force on each section is balanced across the width of section. As the sections are rigid between the ends, this requires that the lifting forces be balanced between the ends to ensure the even distribution across the cutter bar of each section and thus of all the sections. This provides an arrangement in which the force required to lift the header is the same force at any location along the length of the cutter bar, whether that location is at the center section, at a junction between the center section and the wing section or at the wing section. This is achieved in this embodiment by the balancing system which transfers lifting force between the sections with the forces being balanced by the balance beam.

The support assembly carrying the center section and the wings includes a first support defined by the springs arranged to provide a first lifting force for the first frame portion leaving some weight applied by the conventional skid element 16A or ground support of the first frame portion 10A to the ground. The support assembly also includes a second support defined by the balance system to provide a second lifting force for the second frame portion 10B leaving some weight applied by the skid element of the second frame portion to the ground. Symmetrically in a typical three section header the wing section 10C is also carried by the balance system on that side of the center section.

The support assembly thus is arranged to provide floating movement for each of the first 10A and second 10B frame portions such that such that the first and second lifting forces vary such that the weight applied by each of the first and second frame portions to the ground is maintained at least partly balanced. The springs of course provide a floating action of the header frame relative to the propulsion vehicle. The weight applied by each of the first and second frame portions to the ground is maintained at least partly balanced by changing the lifting forces applied to both the first and second frame portions by the springs and the balance system. As the center section and the wings are carried from the combine feeder house, the lifting forces applied to both the first and second frame portions are applied from the propulsion vehicle without gauge wheels.

As the system uses a balance arrangement to balance the loads, the lifting forces applied to both the first and second frame portions is varied by balancing the lifting forces applied to both the first and second frame portions relative to a total lifting force applied to the main frame structure without sensors detecting contact with the ground or sensors detecting forces applied to both the first and second frame portions. However the same arrangement can be provided by using sensors and actuators.

The header frame sections and the reel sections are hinged and supported so that the reel will stay in approximately the same position relative to the cutter bar. Thus the balance system balances the lifting force applied to the ends of the center section relative to the lifting force which is applied to the outboard weight of the wing section so that the lifting force is even across the width of the header. Thus if a lifting force is applied by the ground or any other lifting mechanism for example merely manually lifting the header at a particular location across its width, that would cause the header to rise at that point and to fall at other points. The amount of force necessary to lift the header at that point will be the same as it is at other points and this lifting force can be varied for the total header and proportioned across the width of the header automatically by the balance beams as described hereinafter.

It will be appreciated that the inboard weight of the wing section is transferred through the pivot 27 to the outboard end of the center section and that weight is transferred directly to the balance system. Also the outboard weight of the wing section is transferred through the balance system.

Figure 4:
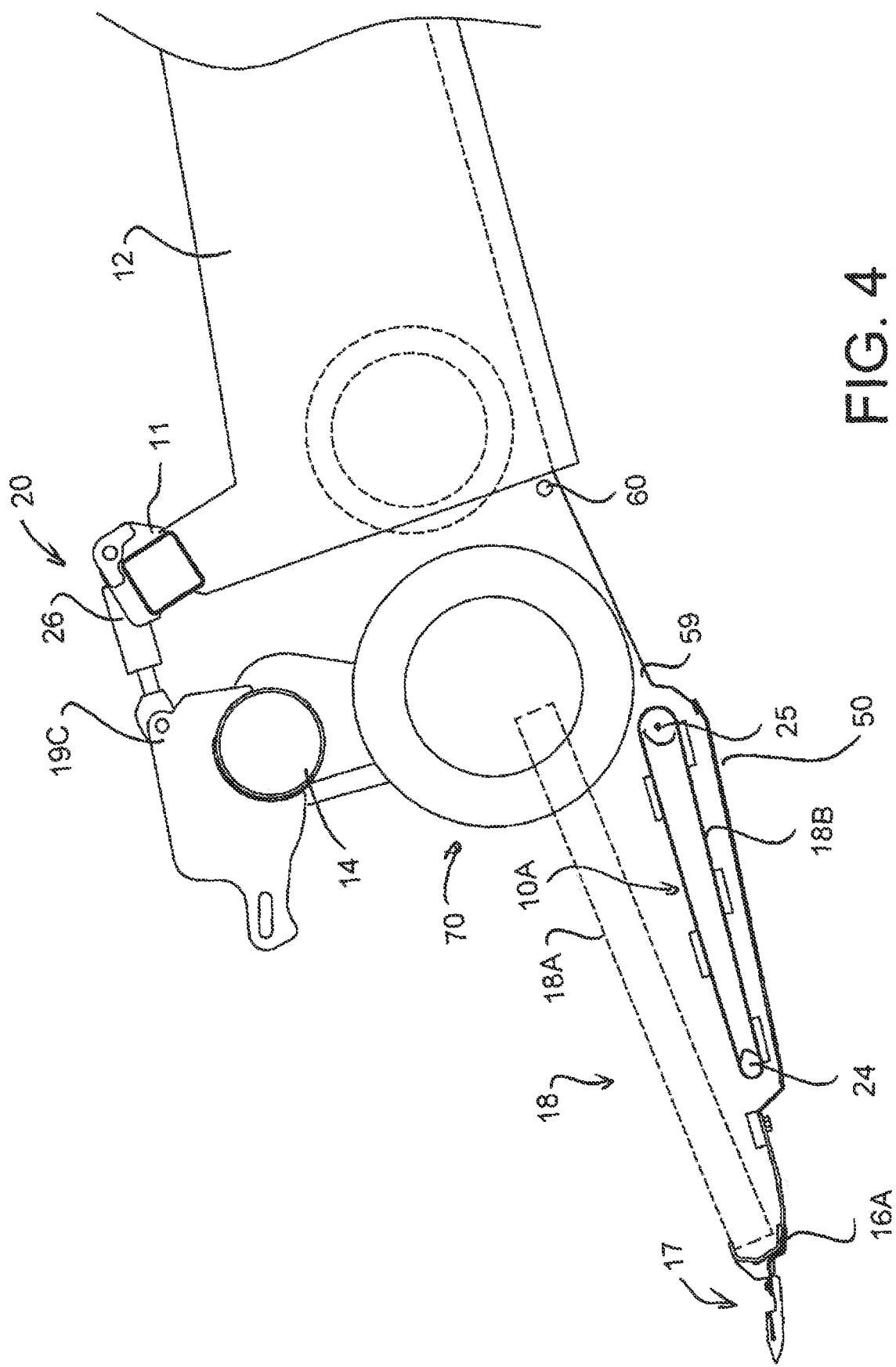

As shown in FIG. 4 in the section 10A at the center discharge, underneath and behind the rear end of the draper 18B is provided a guide sheet or pan 50 which extends from the rear end of the draper 10A rearwardly through a rear position 59 behind the draper to a rear end 60 at the feeder house 12.

The feed draper 10A and the pan or guide sheet 50 are mounted on two parallel side arms 18C (FIG. 2) which extend to a rear end 60 of the pan 59 at which point the arms are pivoted to the feeder house. The front end of each arm is supported by the header on a cross member extending between the arms 15 at the forward end 50A of the pan 59. The front roller 24 of the feed draper is mounted between the arms 18C rearward of the cutter bar. The rear roller 25 is mounted between the arms 18C rearward of the front roller. The pan 50 is mounted between the arms 18C and extends from the rear feed draper roller to the front of the feeder house at the adapter 11. It is necessary for the arms 18C, draper 18B and pan 50 to flex and pivot to accommodate the floating and pivoting action of the header. The rear roller 25 of the draper 23 is thus mounted on the arms and therefore also the draper 23 flexes and twists to accommodate such movement.

The pan 50 may comprise a removable cover 50C underneath the feed draper and the pan 50 both of which span the arms and thus define a common structure. Thus both the draper and the pan 50 pivot about the mounting at the rear end 60.

The pan 50 has a width substantially equal to the width of the draper 23 so that the material discharged from the draper across the full width of the draper is carried rearwardly over the sheet to the feeder house. The feed draper 18B is wider than the space between the side drapers 18A so that the feed draper extends underneath the side drapers to carry the crop therefrom and to reduce the possibility of crop back feeding underneath the side drapers.

The movement of the crop material to the feeder house is assisted by a rotary feed member 70 carried above the pan 50 with a width substantially equal to the width of the pan 50. The rotary feed member 70 includes a drum 71 which carries on its outside surface two helical auger sections 72 arranged at respective ends of the drum and arranged so that rotation of the drum in a counter clockwise direction so as to carry the crop material underneath the rotary feed member across the pan 50 causes the crop material at the side edges of the sheet to be drawn inwardly toward a center of the sheet. At the center of the drum 71 is provided a plurality of fingers or other projecting members (not shown) which direct the crop material rearwardly to enter the feeder house 17. The rotary feed member is located such that the outside edge of the helical flights thereof and the outer edge of the fingers thereof lie in a cylinder which is closely positioned to the rear end of the feed draper 18B. This distance is preferably of the order of 50 mm or less since such a small distance reduces the possibility of crop back-feeding underneath the feed draper 18B and ensures that the crop is stripped from the feed draper by the rotary feed member. The rotary feed member is carried on two side arms which are mounted at their rear end on a transverse shaft. The rear of the header is defined by two rear sheets 81 on respective sides of the header which define an opening 83 at the rotary feed member so that the rotary feed member projects through the opening to operate in cooperation with the sheet 50 in the area at the rear of the header and on top of the sheet 50. In addition the rotary feed member is of a size so that it can cooperate with the sheet 50 in properly feeding the crop material into the feeder house.

Figure 5:
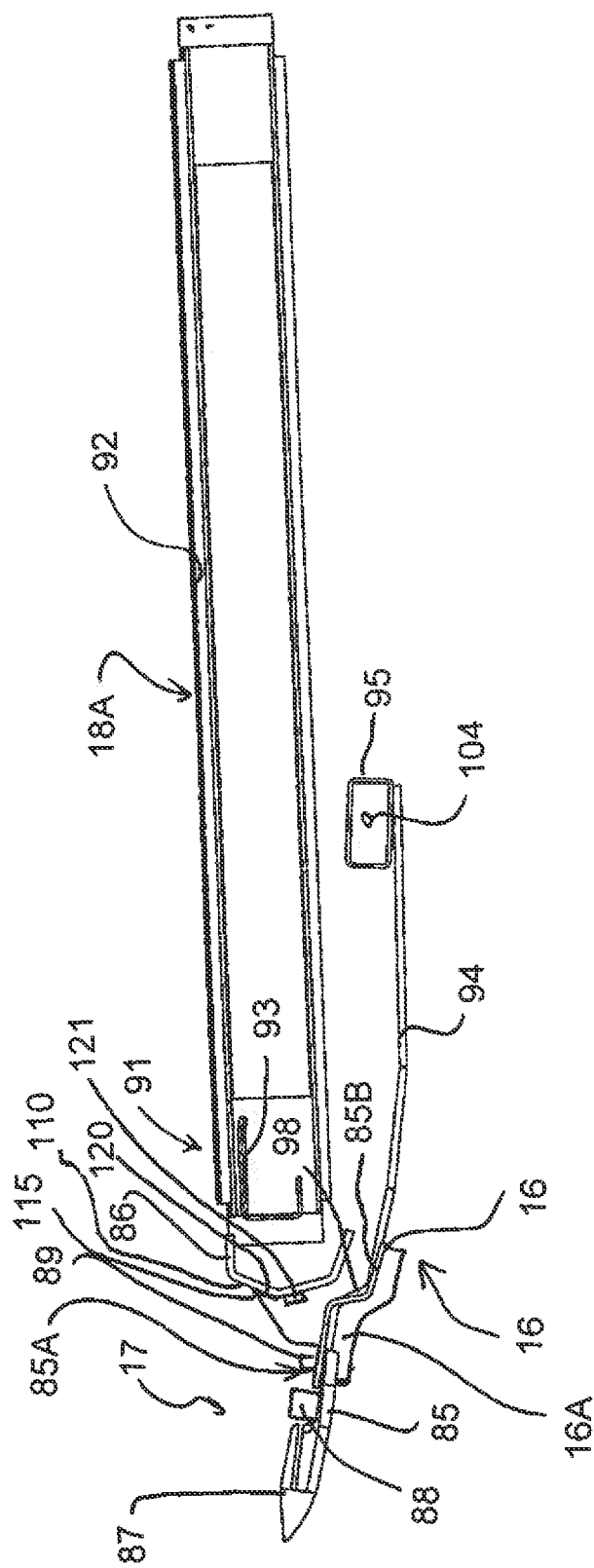
FIG. 5 is a cross sectional view of the components of FIG. 3 on an enlarged scale and showing only the cutter bar and front draper support.
Figure 6:
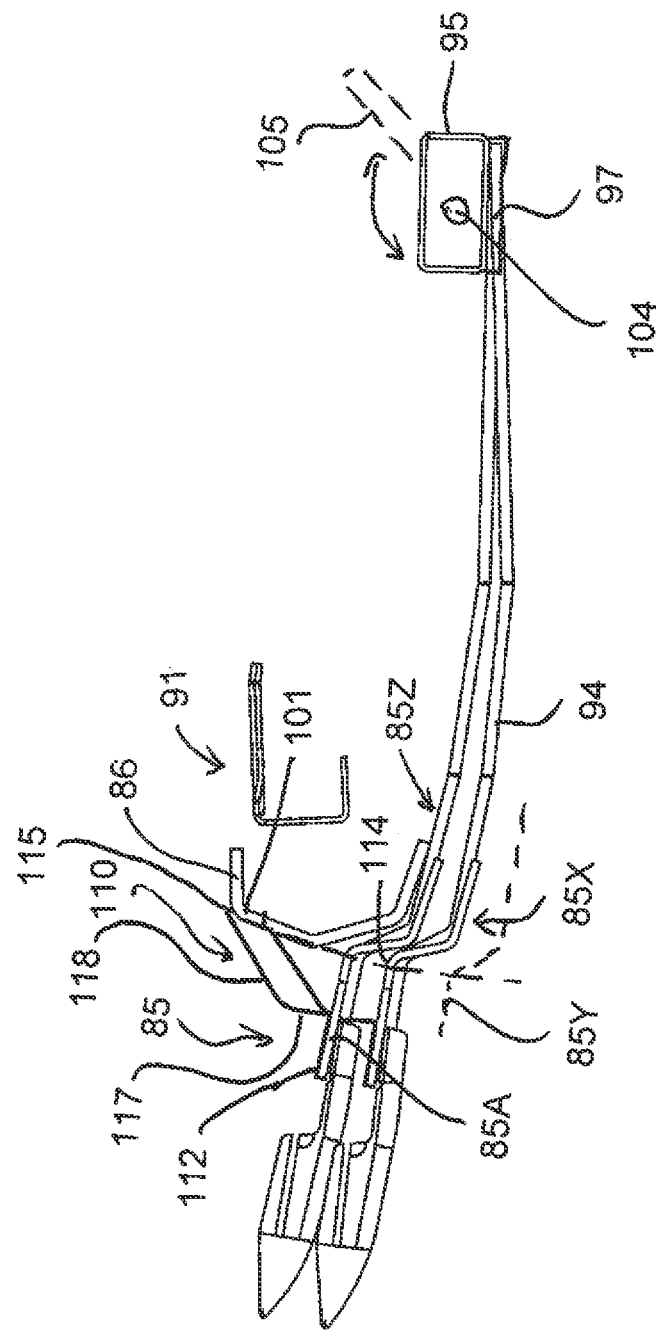
FIG. 6 is a cross sectional view of the components of FIG. 5 showing the cutter bar in different float positions.
Figure 6A:
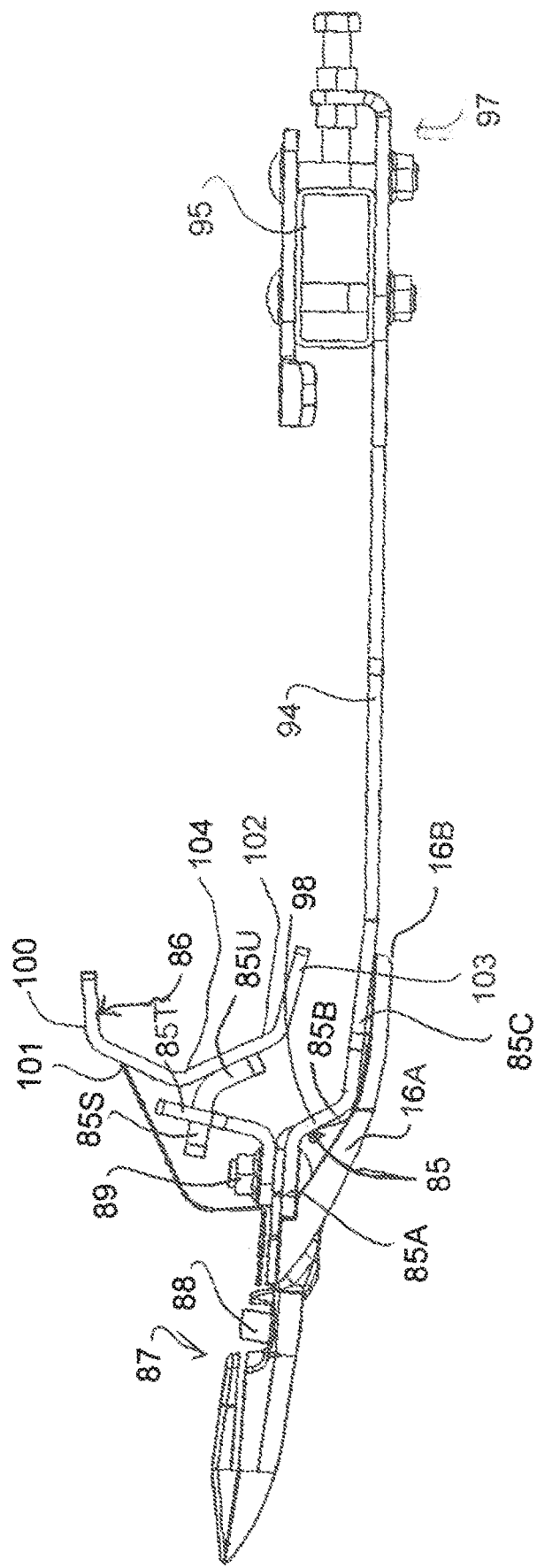
FIG. 6A is a cross sectional view of the components of FIG. 6 showing some aspects in greater detail and showing a number of modifications.

In the arrangement particularly described herein, as shown for example in FIGS. 5, 6 and 6A, the cutter bar 16 is mounted so that, in combination with the flexing of the header frame, the cutter bar itself can flex relative to the header frame to better follow the ground contour.

Thus the cutter bar forms a separate component defined by cutter bar 85 from a further component 86 which forms a draper support bar allowing relative movement between these two components. The cutter bar 85 forms a plate 85A which carries conventional guards 87 and a conventional sickle bar 88. The guards 87 include a lower component bolted onto the underside of the plate 85A and may include an upper component not shown or may comprise a conventional pointed guard as shown. A conventional skid plate 16A is also provided and mounted on the same bolts 89 as the guard 87.

The draper support bar 86 is mounted in fixed position relative to the frame so that it is carried on the frame arms 15 at a forward end thereof. The bar 86 (FIG. 2) extends along the full length of each of the wing sections 10B and 10C so that the outer end of the bar 86 is carried on a fixed endplate 90 fixed to the wing section of the main tube 14 of the frame. In this way the portion of the bar 86 carried by each of the wing sections is fixed relative to the respective wing section and the moves therewith. The bar 86 also extends through the centre section 10A and is carried on the frame members 15 of the centre section. The bar 86 has sufficient stiffness that it is maintained in a fixed position relative to the frame and particularly the members 15 along the full length of the header. The bar 86 is hinged at 86H at the location where the axis of the pin 27A at the hinge 27 passes through the bar 86. Alternatively the bar 86 may have sufficient flexibility to take up the relative movement between the sections 10B and 10C relative to the center section 10A of the header without provision of a specific hinge. In any event, the bar 86 can bend to accommodate the upward and downward flexing movement of each of the wing sections 10B, 10C relative to the centre section 10A.

In some cases the end plate 90 can also be arranged to provide flexibility of the cutter bar 85 relative to the support bar 86. That is the end members also can be formed as flexible components providing flexibility of the cutter bar along its full length. In this arrangement, the bar 86 is held fixed to the frame but the cutter bar 85 can flex. This can be used in a construction in which the sickle bar is driven from a center knife drive so that rigid mounting of the ends of the cutter bar is not required.

As shown in FIG. 5, the bar 86 carries a forward end 91 of the draper canvas 92 of the side drapers 18A on a support member 93. This arrangement is shown in more detail in U.S. Pat. No. 5,459,986, the disclosure of which is incorporated herein by reference. In this way the forward edge 91 of the draper is held fixed relative to the frame and does not move with the cutter bar 85.

As best shown in FIG. 6A, the cutter bar 85 includes the generally flat plate portion 85A to which the guards are mounted in conventional manner. At the rear of the plate 85A is a down-turn portion 85B which extends downwardly at an angle inclined rearwardly. These portions provide flexibility for the cutter bar so that it can flex upwardly and downwardly from a central position shown in FIG. 5. The amount of flexibility is limited so that the total flexibility relative to the respective one of the frame portions allowed by the mounting components is less than a total of six inches, preferably less than a total of four inches and more preferably and typically of the order of two inches. That is, if the frame including the beam 86 is held in fixed position without any pivotal movement of the wing sections, the total amount of movement of a centre part of the cutter bar relative to the end plates 90 will be in the range stated above and typically a maximum of 2 inches between an uppermost position and a lowermost position. The flexibility is however such that this flexing movement can occur at any position across the width of the cutter bar so that some portions may be raised and other portions may be lowered depending upon the height of the ground at the position which the cutter bar contacts. At the rear of the portion 85B of the cutter bar is provided a rearwardly extending component 85C in the form of a plurality of longitudinally spaced tangs which carry the conventional skid plate 16A which forms part of the cutter bar and is arranged to contact the ground in a sliding action as descried above. The skid plate is typically formed of a wear resistant plastics material which is suitably attached to the metal bar 85A so as to contact the ground as the cutter bar moves over the ground. It will be noted that the skid plate in FIG. 6A has a rear edge 16B at the rear of the tangs 85C and that both of these components are located underneath the bottom wall 103 of the draper engagement bar 86. The location of the skid plate underneath the bar 86 occurs due to the very close proximity between the cutter bar 85 and the draper bar 86. This proximity is obtained by the small amount of movement of the cutter bar which is less than 4 inches and typically of the order of 2 inches.

That is, when unsupported by the ground, the cutter bar 85 will sag from the central height 85X shown in FIG. 5 to the lowered height shown in dash line 85Y in FIG. 6 by a distance of the order of 1 to 3 inches, at which point the flexibility and support of the cutter bar prevent or inhibit any further sagging under gravity. In this way the cutter bar can sag into a depression in the ground surface. Typically the cutter bar is pushed up by contact with the ground to the raised position shown in FIG. 6 at 85Z and when the support from the ground is removed, the cutter bar will drop by a distance of the maximum allowed movement which is typically 2 inches as set forth above.

Figure 11:
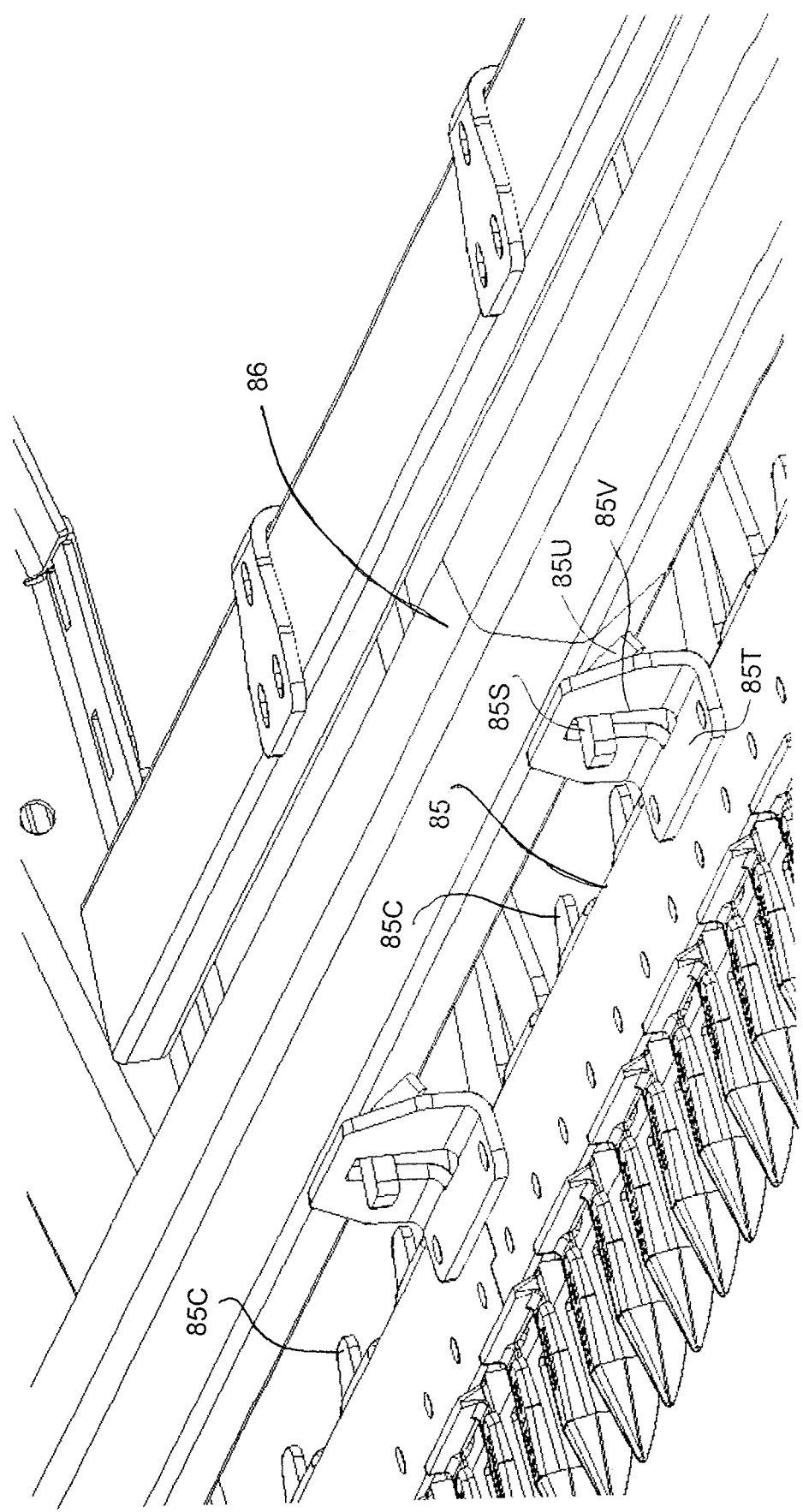
FIG. 11 is a further isometric view of the components at the center section of FIG. 10 on a larger scale.

In some cases the bottom position 85Y may be determined by the flexibility of and tension in the cutter bar 85. However as shown in FIGS. 6A and 11 a physical bottom stop may be provided between the bar 86 and the cutter bar 85. This comprises a finger 85S mounted by a bracket 85U on the front face of the bar 86 which engages into a slot 85*v* in a bracket 85T carried on the top surface of the cutter bar 85. The length of the slot 85V determines the amount of movement and the bottom of the slot determines the bottom stop. A series of such brackets is provided at spaced positions along the cutter bar.

In addition to this movement of the cutter bar itself relative to the frame, the wing sections, also can flex upwardly and downwardly from a center aligned position by distance of the order of 5 inches as previously discussed making a total movement of the order of 10 inches between the top and bottom positions. The above amount of movement of the cutter bar alone by flexing movement of the cutter bar is very small in comparison with other systems of a comparable nature. However this very small flexibility in combination with the flexing of the wings has been found to provide a very effective action of the cutter bar in following ground contours.

The cutter bar 85 is not supported from the draper support bar 86 but is instead carried by a plurality of forwardly extending members 94 mounted on a beam 95. The beam 95 is attached to the frame members 15 so that it is held rigid with the frame portion to which it is attached. As shown in FIG. 2, the beam 95 is attached at its outer end to the end plate 90 and then is connected along its length to the individual ones of the legs 15. This includes the leg 15 of the innermost end of the respective wing section. In addition a beam portion 96 is provided in the centre section 10A extending from the end leg 15X of the centre section toward the beam 94 and aligned therewith but spaced outwardly therefrom so as to define an end 96A. The cutter bar 85 is thus supported along most of its length by the forwardly extending members 94 attached to the beam 95 and 96.

However in view of the presence of the centre draper 18B, the beam 95 cannot extend through this area and in addition the forwardly extending members 94 are also prevented from supporting the cutter bar in this area in view of the presence of the front roller 24 of the centre draper.

The forwardly extending members 94 each comprise a separate spring blade bolted in fixed position and its rear end to the beam 95 by a fastener 97. The rear end of the spring blade therefore is fixed at the rear end and cannot pivot relative to the beam at 95 but the blade can flex upwardly and downwardly to accommodate the flexing movement of the cutter bar 85. The amount of flexing movement of the cutter bar 85 is therefore controlled by both the flexibility of the cutter bar itself and the flex blades 94. The flex blades 94 are typically formed from a single flat sheet of spring steel with a forward upward turn 98 to engage under the portion 85B of the plate 85A.

In view of the relatively small amount of movement in the flexing of the cutter bar, the spring blades 94 can be relatively short. Thus the beam 95 is positioned well in front of the rear sheets 81 of the header leaving a clear space between the bottom of the header frame and the beam 95. Thus the beam is positioned well in front of the rear edge 18D of the draper and typically approximately midway between the front 18E and rear 18D edges of the draper. The blades 94 thus do not extend backward to the frame at the sheets 81 and there is no requirement for pivotal movement of the blades or any other spring support for the blades so the construction is very simple and uses a limited amount of metal thus reducing weight. The flex blades 94 are wider at the front and fear to allow effective connection to the cutter bar 85 and the support bar 95 than at the middle to allow softer flexing in the middle. The flex blades 94 are fastened at the front and rear by suitable fastening which can include welded and/or bolted components to provide required strength and replaceability as required.

The beam 95 is located under the bottom or return run of the draper 18A but in view of the simple construction is supported well above any area which might engage the ground behind the cutter bar.

The support for the cutter bar 85 is provided solely by the flexible blades 94 described above and also additional flexible blades 107 in the area of the centre draper as described below. There is no requirement for any additional pivotal components as the springs provide both the flexibility for the movement of the cutter bar and also the support of the cutter bar. This support includes the up-and-down support against gravity and also a forward to rearward support necessary to prevent bending of the cutter bar rearwardly in the event of impact with obstacles.

As shown in FIG. 6, in the uppermost position 85Z of the flexing movement of the cutter bar, the plate 85A engages up against lower portions of the bar 86. The bar 86 includes a top flange 100, two wall portions 101 and 102 converging to an apex 104 at the front and a bottom flange 103 extending rearwardly from the bottom of the wall portion 12. This forms a generally C shaped structure which has sufficient strength to provide the rigidity required. The shape of the forward end of the blade 94 is arranged such that it butts against the wall portion 102 and the flange 103 to act as an upper stop.

An optional feature is shown in FIG. 6 where the beam 95 can be rotated around an axis 104 by a lever mechanism generally indicated at 105 from its initial position shown in FIG. 5 to a second position clockwise around the axis so as to lift the blade 94 upwardly. This movement can be used to push the cutter bar 85 into its raised position so that the cutter bar is locked against flexing movement. This operation can be used in a situation where the cutter bar is raised off the ground and is required to be held fixed by the header for cutting the crop at a raised height. This movement also be used to adjust the upper and lower end positions of the movement of the cutter bar.

Figure 7:
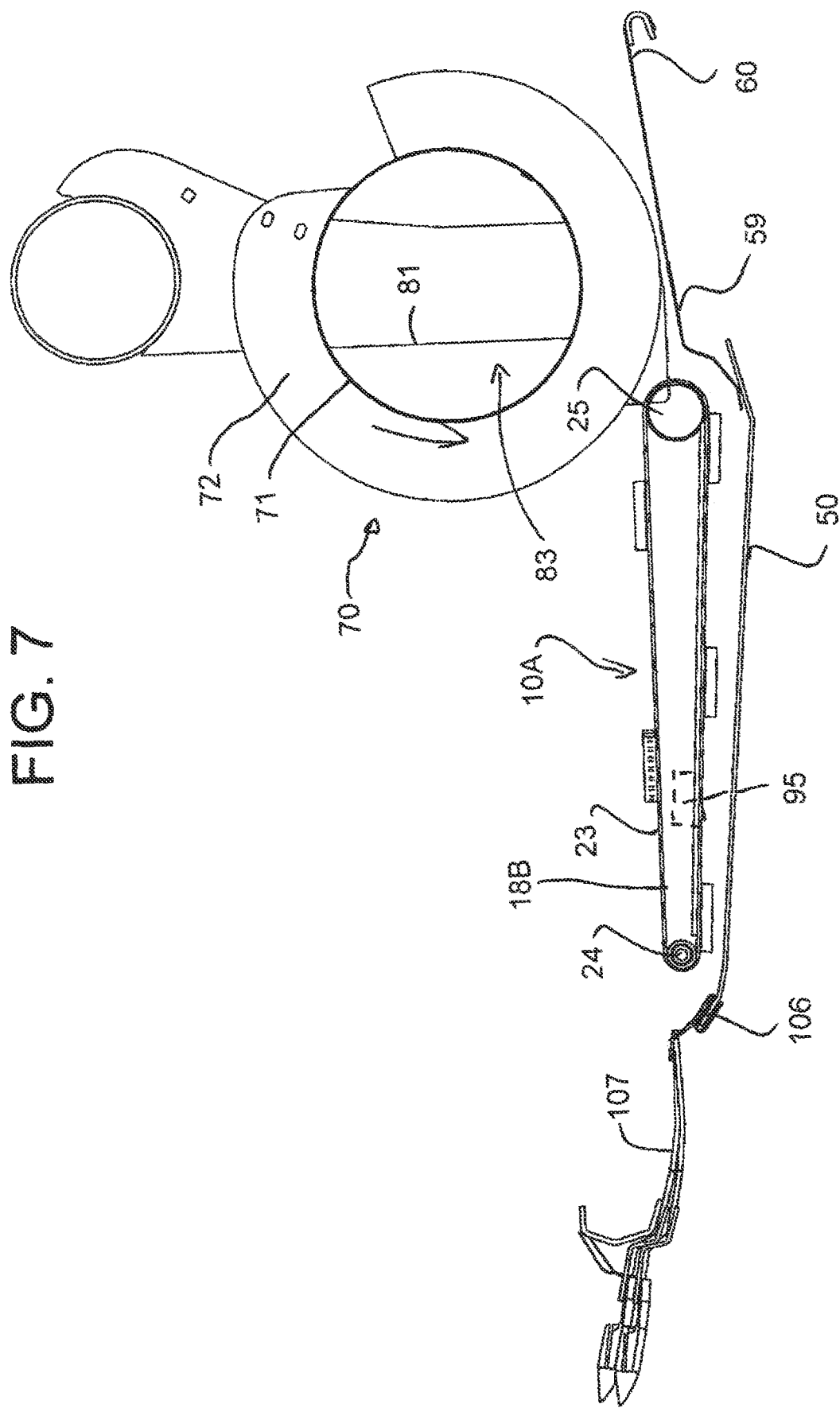
FIG. 7 is a cross sectional view of the components of FIG. 4 on an enlarged scale and showing primarily the cutter bar and center draper support.
Figure 10:
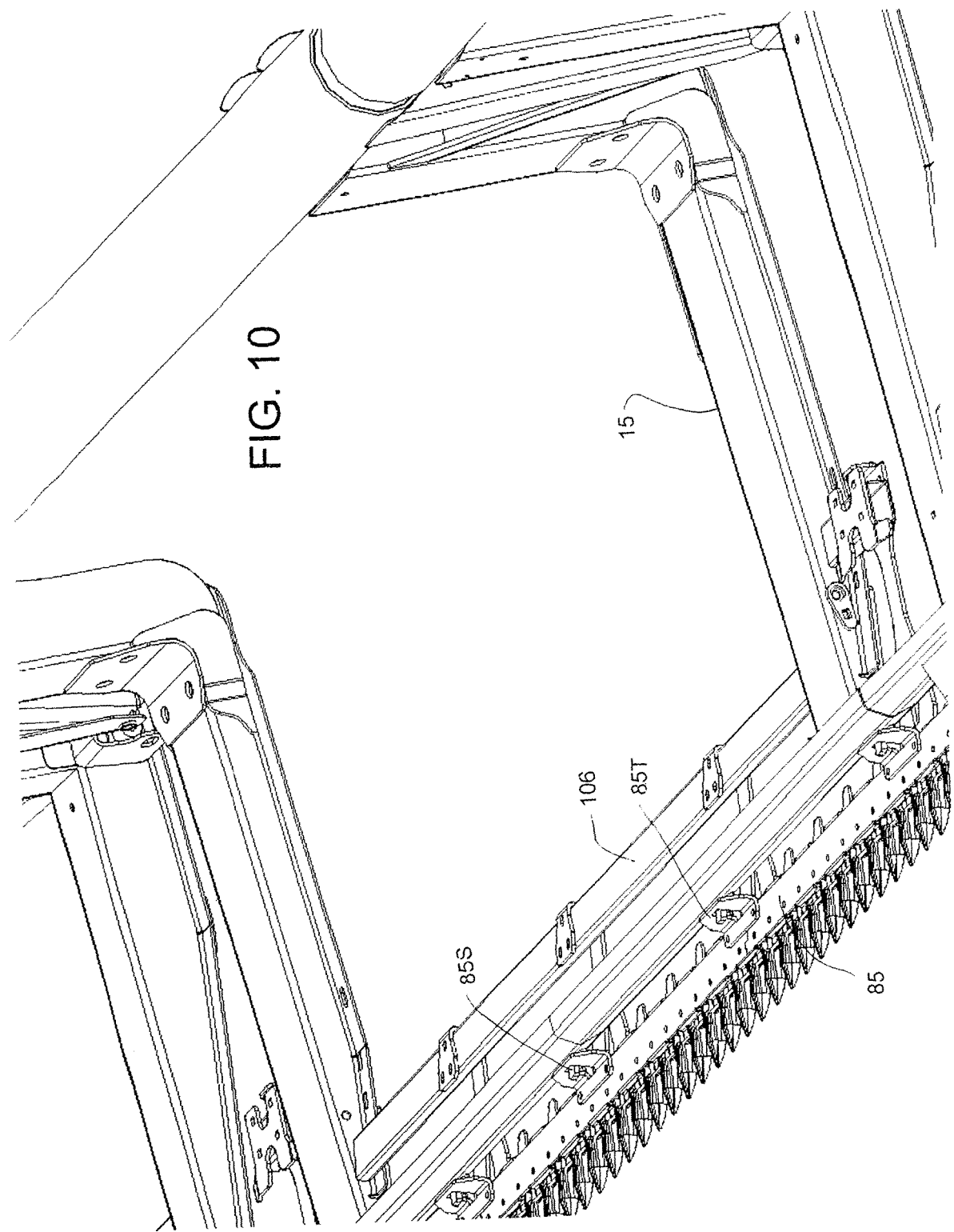
FIG. 10 is an isometric view of the components at the center section of the header at the center draper with the draper components removed and showing some further details and some modifications.

In the centre section shown in FIGS. 7 and 7A, as stated above the presence of the centre draper 18B interferes with the possibility for the beam 95 to pass through this area. In this limited area, therefore, an additional support member 106 is provided connection between the frame members 15 of the centre frame section 10A at a position in front of the front draper roller 24. The beam or support member 106 is therefore fixed relative to the frame of the centre section and is connected to the centre portion of the cutter bar by additional shorter spring blades 107. These blades are shaped and arranged similarly to the above described blades 94 and function in the same manner but are of a reduced length due to the limitations on the geometry available. In view of their shorter length, they typically have a reduced spring strength so that the amount of force applied to the cutter bar in this area is equal approximately to that of the wing sections.

In view of the fact that the cutter bar 85 is flexing upwardly and downwardly relative to the support bar 86, there is provided a deflector plate 110, best shown in FIG. 7A, which extends between the cutter bar 85 and the front face of the inclined wall 101 of the support bar 86. The deflector plate 110 is formed from a simple sheet of metal or other suitable material which has a front horizontal flange 112 directly attached to the top of the plate 85A of the cutter bar so as to be fixed thereto for movement there with. An upper sliding flange 115 contacts the front face of the wall 101 of the support bar 86. The flange 115 is shaped to lie flat against the front surface of the wall 101. The arc of movement of the cutter bar shown at 114 in FIG. 6 is shaped to follow substantially the angle of the wall 101 so that the flange 115 slides along the wall 101 with little or no movement forwardly or rearwardly relative to the wall 101 at right angles to the direction of movement. The flexing of the cutter bar 85 therefore can be taken up by the sliding action of the flange 115 on the wall 101 with little or no deformation of the sheet metal plate 110. The plate therefore can be fixed at the front flange 112 with no requirement for mounting springs to accommodate larger movements. The requirement for a slight flexing of the plate 110 can be taken up simply by a slight deformation of the wall joining the flange 112 to the flange 115. As best shown in FIG. 7A, the wall of the deflector plate 110 is formed by an upstanding wall portion 117 and a rearwardly inclined wall portion 118 with the flange 115 at the top edge of the inclined wall 118. As there is a very short distance between the rear edge of the plate 85A and the front face of wall 101, typically less than 4.0 inches, due to the small amount of movement of the cutter bar in this design, the deflector does not need to pivot but is instead bolted at its front edge directly to the flat upper face of the cutter bar and extends the short distance to its rear edge which can simply slide over the front surface of wall 101. The deflector plate is formed in sections separated along the length of the cutter bar with either a slight space between the ends 119 of the sections or a short overlap portion. The sections can be of the order of 3 feet in length which allows the cutter bar to flex while the deflector plate remains straight with the required bending action taking place at the joints 119 between the two sections. There is no need therefore for an interlocking action at the ends 119. Also the small degree of movement f the order of 2 inches between the cutter bar 86 and the support bar 86 allows the step defined by the deflector plate 110 to be relatively small to avoid any difficulty in the cut crop being carried over the deflector plate to the draper, in FIG. 5 it is shown that the flange 115 of the deflector plate is inclined downwardly so as to lie flat against the front surface 110.

As an alternative to the stop member previously defined, a series of stop members 121 can be located on the support bar 86 at spaced positions along the bar 86 so that the bottom edge of the deflector plate 110 engages the stop when the bar 85 drops to its lowest allowed position thus providing a positive stop against further downward movement. This stop system which operates on the cutter bar 85 rather than on the spring blades 94 prevents the cutter bar 85 from dropping too low so that the flexibility provide by the cutter bar 85 and the blades 94 can be relatively soft while preventing the cutter bar from flexing too much, which can cause bouncing or oscillation to occur.

The invention claimed is:

1. A crop harvesting header comprising:
   a frame extending across a width of the header for movement in a forward direction generally at right angles to the width across ground including a crop to be harvested;
   a mounting assembly for carrying the frame on a propulsion vehicle for up and down movement of the frame relative to the vehicle;
   a cutter bar arranged to move over the ground in a cutting action and having a forwardly extending plate on to which knife guards are mounted carrying a sickle knife operable for cutting the crop as the header is moved forwardly across the ground;
   the cutter bar including a skid plate which forms part of the cutter bar and is arranged to contact the ground in a sliding action;
   a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;
   the draper transport system including a longitudinally extending draper engagement bar adjacent the front edge of the draper;
   wherein the draper engagement bar engages the draper along a length of the draper and carries the front edge of the draper;
   the cutter bar being mounted on the frame at spaced positions along the length of the frame by elongate mounting components each connected at a rear end to a rigid beam of the frame and extending forwardly from the rigid beam to a front end connected to the cutter bar and which allow up and down flexing movement of the cutter bar relative to the rigid beam of the frame;
   wherein the draper engagement bar is fixed to the frame for movement therewith so that the front edge of the draper is held fixed relative to the frame and does not move with the cutter bar;
   wherein the cutter bar is mounted immediately forward of the draper engagement bar with the skid plate of the cutter bar underlying the draper engagement bar; and
   a center section at the discharge location of the header at which is located a fore and aft draper for carrying the cut crop rearwardly from the cutter bar to the discharge location, the fore and aft draper including a front draper roller located at a position spaced rearwardly of the cutter bar, and wherein there is provided a center rigid support bar extending parallel to the cutter bar in front of the front draper roller and at least one of said elongate mounting components extending forwardly from the center rigid support bar to the cutter bar to allow said flexing of the cutter bar.

2. The crop harvesting header according to claim 1 wherein a forward end of the rigid beam is forward of the rear edge of the draper.

3. The crop harvesting header according to claim 1 wherein the rigid beam is located at a position spaced forwardly of the rear of the frame so as to leave an open space therebetween.

4. The crop harvesting header according to claim 1 wherein the elongate mounting components each comprise a flexible spring blade rigidly attached at its rear end to the rigid beam and rigidly attached at its front end to the cutter bar with relative movement of the cutter bar being provided by flexing of the spring blade.

5. The crop harvesting header according to claim 1 wherein the rigid beam is rearward of the draper engagement bar.

6. The crop harvesting header according to claim 1 wherein said at least one center rigid support bar is rearward of the draper engagement bar and forward of the rigid beam of the frame.

7. The crop harvesting header according to claim 1 wherein the cutter bar has a constant level of flexibility along its length.

8. The crop harvesting header of claim 1 wherein there is provided a flexible crop deflector plate extending between the cutter bar and the draper engagement bar, the deflector plate having a front edge fixedly attached to the cutter bar and having a rear edge surface in sliding contact with a front surface of the draper engagement bar.

9. The crop harvesting header according to claim 8 wherein the front edge of the flexible crop deflector plate is bolted to the cutter bar in a manner which prevents pivoting movement of the plate relative to the cutter bar and wherein the up and down movement of the cutter bar is accommodated in the deflector plate by said sliding movement of the rear edge and by flexing within the plate without any pivotal movement.

10. The crop harvesting header according to claim 8 wherein the deflector plate includes a flexible wall standing upwardly from the cutter bar and extending rearwardly to the rear edge contacting the front surface of the draper engagement bar.

11. The crop harvesting header according to claim 8 wherein the deflector plate is divided longitudinally into a plurality of end to end sections with an overlap or space between each and the next at the ends.

12. The crop harvesting header according to claim 8 wherein the deflector plate is a single component between the cutter bar and the draper engagement bar so that relative movement between the front edge fixedly attached to the cutter bar and the rear edge is taken up by flexing in the deflector plate.

13. The crop harvesting header according to claim 8 wherein the draper engagement bar provides a surface against which the rear end of the deflector plate abuts where the surface is shaped to substantially follow an arc of movement of the cutter bar as the cutter bar flexes.

14. The crop harvesting header according to claim 1 wherein there is provided a physical stop to limit downward movement of the cutter bar connected between the draper engagement bar and the cutter bar.

15. The crop harvesting header according to claim 1 wherein the frame is divided at least into a first frame portion and a second separate frame portion with the second connected by a pivot coupling arranged for pivotal movement of the second frame portion relative to the first frame portion about a pivot axis parallel to the forward direction and intersecting the cutter bar so that, as the second frame portion pivots, the cutter bar bends in the area adjacent the pivot axis to accommodate the pivotal movement and wherein the draper engagement bar includes a hinge at the pivot axis.

16. The crop harvesting header according to claim 15 wherein the amount of flexing movement of the cutter bar relative to the respective one of the first and second frame portions allowed by the mounting components is less than 4 inches.

17. A crop harvesting header comprising:
 a frame extending across a width of the header for movement in a forward direction generally at right angles to the width across ground including a crop to be harvested;
 a mounting assembly for carrying the frame on a propulsion vehicle for up and down movement of the frame relative to the vehicle;
 a cutter bar arranged to move over the ground in a cutting action and having a forwardly extending plate on to which knife guards are mounted carrying a sickle knife operable for cutting the crop as the header is moved forwardly across the ground;
 a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;
 the draper transport system including a longitudinally extending draper engagement bar adjacent the front edge of the draper;
 wherein the draper engagement bar engages the draper along a length of the draper and carries the front edge of the draper;
 the cutter bar being mounted on the frame at spaced positions along the length of the frame by elongate mounting components each connected at a rear end to a rigid beam of the frame and extending forwardly therefrom to a front end connected to the cutter bar and which allow up and down flexing movement of the cutter bar relative to the rigid beam of the frame;
 wherein the draper engagement bar is fixed to the frame for movement therewith so that the front edge of the draper is held fixed relative to the frame and does not move with the cutter bar;
 wherein there is provided a flexible crop deflector plate extending between the cutter bar and the draper engagement bar, the deflector plate having a front edge fixedly attached to the cutter bar in a manner which prevents pivoting movement of the deflector plate relative to the cutter bar and having a rear edge surface in sliding contact with a surface of the draper engagement bar;
 wherein the up and down movement of the cutter bar relative to the draper engagement bar is accommodated in the deflector plate by said sliding movement of the rear edge and by flexing within the plate without any pivotal movement; and
 wherein there is provided a center section at the discharge location of the header at which is located a fore and aft draper for carrying the cut crop rearwardly from the cutter bar to the discharge location, the fore and aft draper including a front draper roller located at a position spaced rearwardly of the cutter bar, and wherein there is provided a center rigid support bar extending parallel to the cutter bar in front of the front draper roller and at least one of said elongate mounting components extending forwardly from the center rigid support bar to the cutter bar to allow said flexing of the cutter bar.

18. The crop harvesting header according to claim 17 wherein the elongate mounting components each comprise a flexible spring blade rigidly attached at its rear end to the rigid beam and rigidly attached at its front end to the cutter bar with relative movement of the cutter bar being provided by flexing of the spring blade.

19. The crop harvesting header according to claim 17 wherein the deflector plate is divided longitudinally into a plurality of end to end sections with an overlap or space between each and the next at the ends.

20. A crop harvesting header comprising:

a frame extending across a width of the header for movement in a forward direction generally at right angles to the width across ground including a crop to be harvested;

the frame including a center section and two wing sections each of which is pivotally connected to the center section such that each wing section pivots upwardly and downwardly about a respective pivot axis generally parallel to the direction of movement;

a main mounting assembly for carrying the center section of the frame on a propulsion vehicle for up and down floating movement of the center section relative to the propulsion vehicle;

each wing section having a wing mounting assembly for carrying the wing section of the center section for up and down floating movement of the wing section relative to the center section;

a cutter bar arranged to move over the ground in a cutting action and having a forwardly extending plate on to which knife guards are mounted carrying a sickle knife operable for cutting the crop as the header is moved forwardly across the ground;

a draper transport system for moving the cut crop toward a discharge location of the header including at least one draper mounted on rollers generally parallel to the forward direction so that the draper carries the crop transverse to the forward direction, the draper having a front edge adjacent the cutter bar and a rear edge adjacent a rear of the frame;

the draper transport system including a longitudinally extending draper engagement bar adjacent the front edge of the draper;

wherein the draper engagement bar engages the draper along a length of the draper and carries the front edge of the draper;

the cutter bar being mounted on the frame at spaced positions along the length of the frame by elongate mounting components each connected at a rear end to a rigid beam of the frame and extending forwardly therefrom to a front end connected to the cutter bar and which allow up and down flexing movement of the cutter bar relative to the rigid beam of the frame;

wherein the draper engagement bar is fixed to the frame for movement therewith so that the front edge of the draper is held fixed relative to the frame and does not move with the cutter bar;

wherein there is provided a flexible crop deflector plate extending between the cutter bar and the draper engagement bar, the defector plate having a front edge fixedly attached to the cutter bar in a manner which prevents pivoting movement of the deflector plate relative to the cutter bar and having a rear edge surface in sliding contact with a surface of the draper engagement bar;

wherein the up and down movement of the cutter bar relative to the draper engagement bar is accommodated in the deflector plate by said sliding movement of the rear edge and by flexing within the plate without any pivotal movement;

wherein the amount of flexing movement of the cutter bar relative to the respective one of the center and wing frame portions allowed by the elongate mounting components is less than 4 inches; and wherein the discharge location is provided within the center section of the header at which there is located a fore and aft draper for carrying the cut crop rearwardly from the cutter bar to the discharge location, the fore and aft draper including a front draper roller located at a position spaced rearwardly of the cutter bar, and wherein there is provided a center rigid support bar extending parallel to the cutter bar in front of the front draper roller and at least one of said elongate mounting components extending forwardly from the center rigid support bar to the cutter bar to allow said flexing of the cutter bar.

21. The crop harvesting header according to claim 20 wherein the elongate mounting components each comprise a flexible spring blade rigidly attached at its rear end to the rigid beam and rigidly attached at its front end to the cutter bar with relative movement of the cutter bar being provided by flexing of the spring blade.

* * * * *